United States Patent [19]

Boeck

[11] Patent Number: 4,662,483

[45] Date of Patent: May 5, 1987

[54] DISC BRAKE RETRACTOR

[76] Inventor: Leon W. Boeck, Rte. 1, Box 138, Easton, Minn. 56025

[21] Appl. No.: 791,695

[22] Filed: Oct. 28, 1985

[51] Int. Cl.⁴ ............................................. F16D 55/22
[52] U.S. Cl. .................. 188/72.3; 192/70.28; 192/101
[58] Field of Search ............................ 188/72.3, 216; 192/70.28, 101

[56] References Cited

U.S. PATENT DOCUMENTS

| | | | |
|---|---|---|---|
| 3,008,546 | 11/1961 | Erickson | 188/72.3 |
| 3,108,658 | 10/1963 | Bassett | 188/367 |
| 3,392,808 | 7/1968 | Soltis, Jr. | 188/72.3 |
| 3,456,767 | 7/1969 | Hollnagel et al. | 188/120 |
| 3,469,658 | 9/1969 | Forsythe | 188/72.4 |
| 3,768,603 | 10/1973 | Hoffman | 188/72.3 |
| 3,931,871 | 1/1976 | Martin | 188/18 A X |
| 4,223,764 | 9/1980 | Flotow | 188/72.3 X |
| 4,284,176 | 8/1981 | Haraikawa et al. | 188/72.3 X |
| 4,364,455 | 12/1982 | Oshima | 188/1.11 |
| 4,390,084 | 6/1983 | Haraikawa et al. | 188/72.3 X |

FOREIGN PATENT DOCUMENTS 164371  7/1980  Netherlands ...................... 188/72.3

Primary Examiner—George E. A. Halvosa
Attorney, Agent, or Firm—Merchant, Gould, Smith, Edell, Welter & Schmidt

[57] ABSTRACT

A brake release attachment for a caliper type disc brake is disclosed where the brake includes a rotary brake disc and first and second brake friction pads on opposite sides of the disc. A caliper has a first end which presses a first backing plate toward the disc while the first end of the caliper moves away from the disc. The attachment comprises a pair of rigid rod members secured to the backing plate and extending generally perpendicularly away from the plate. Rigid tabs are connected to the caliper for movement therewith and mounted adjacent the rods. Springs are carried on the rods and disposed on the rods to compress as the tabs move with the caliper away from the disc. A pair of rigid stops are secured to the caliper for movement therewith with the stops aligned opposing free ends of the rods blocking the rods from moving more than a predetermined desired stroke away from the disc.

9 Claims, 5 Drawing Figures

U.S. Patent  May 5, 1987  Sheet 1 of 2  4,662,483
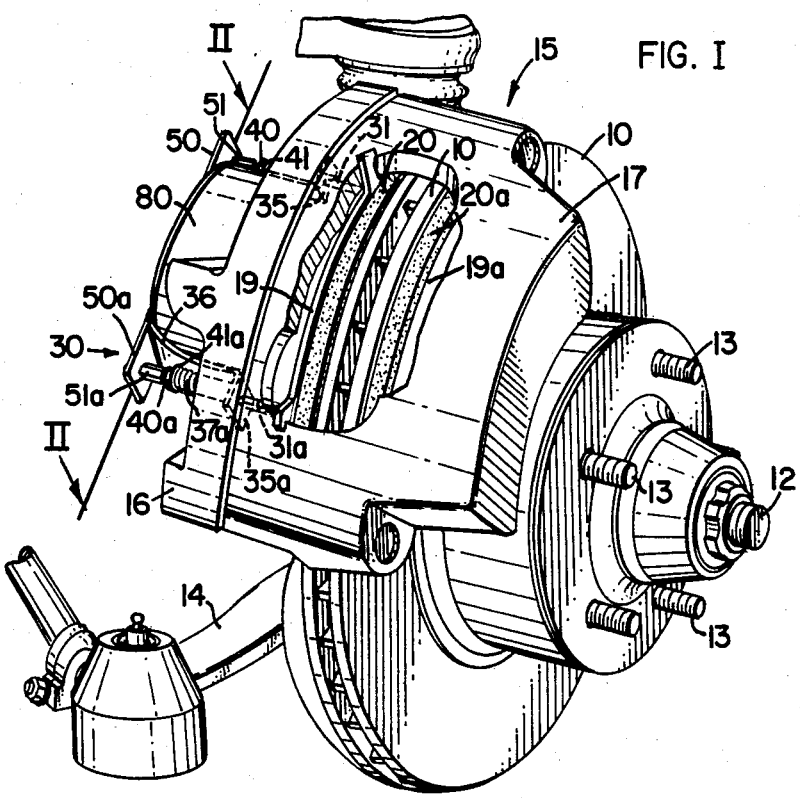
FIG. I
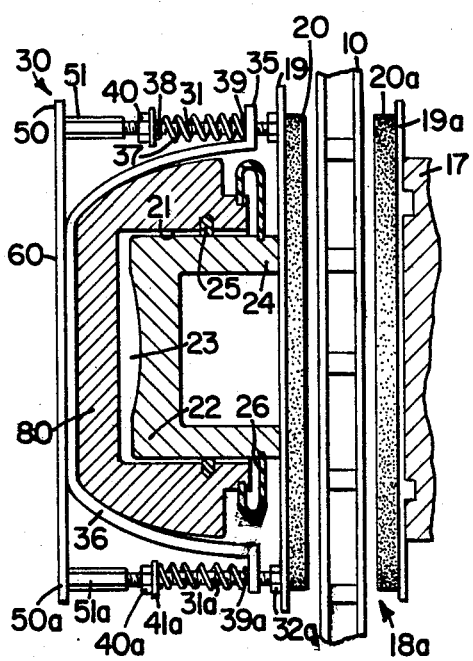
FIG. II
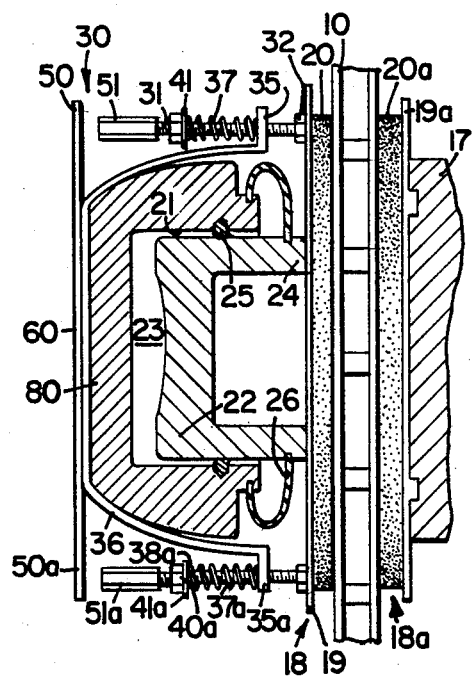
FIG. III

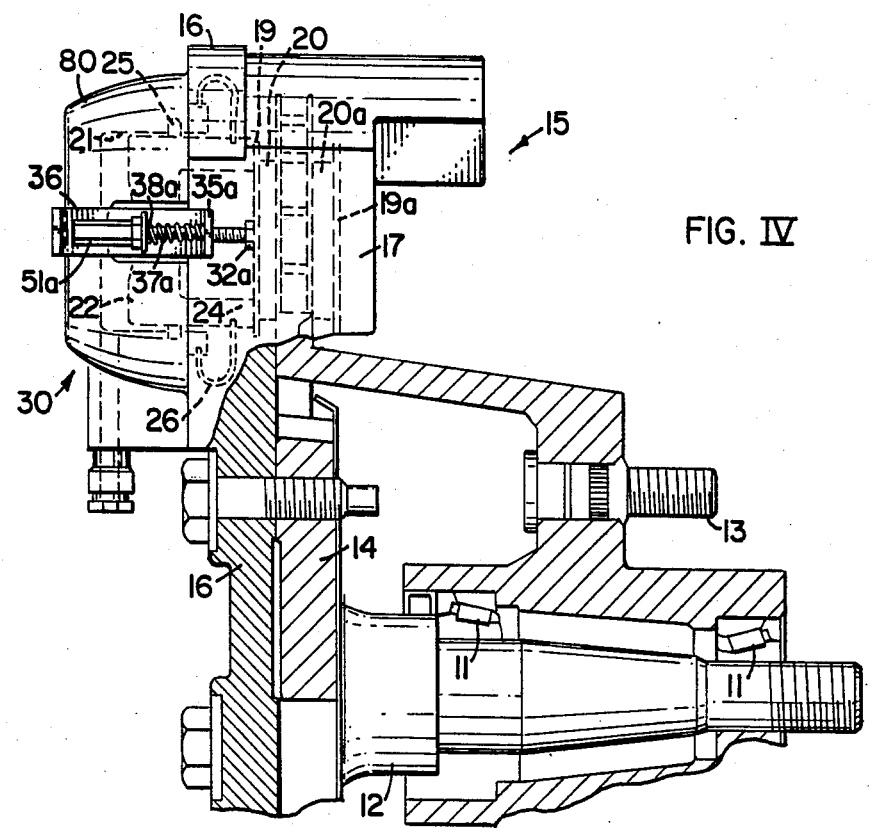
FIG. IV
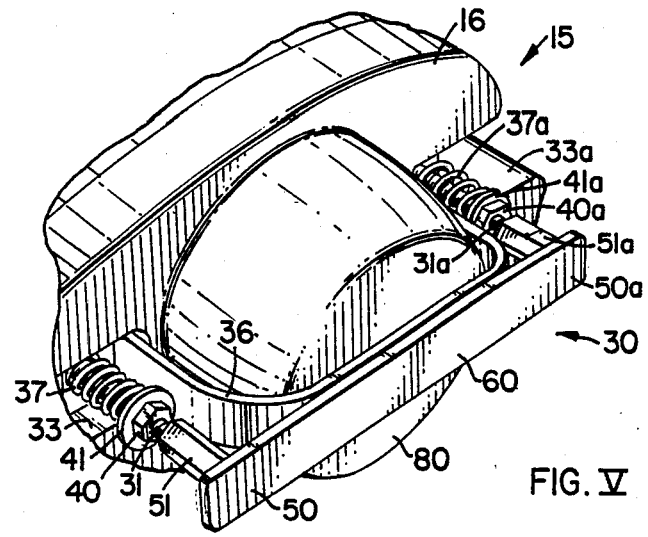
FIG. V

DISC BRAKE RETRACTOR

BACKGROUND OF THE INVENTION

I. Field of the Invention

This invention pertains to brake mechanisms for slowing or stopping movement of a rotary disc. More particularly, this invention pertains to such brake mechanisms with means for assuring positive retraction of the braking mechanism from the rotary disc when the brake is disengaged.

II. Description of the Prior Art

Disc brakes are widely used on automobiles, trucks, motor homes and other vehicles. Conventional disc brakes comprise a pair of friction pads disposed on opposite sides of a rotatable disc. When a brake is engaged, the friction pads are displaced towards the disc to clamp the disc between the friction pads. Commonly, the friction pads are forced towards the disc by means of hydraulic pressure. In such applications, a piston is provided within a cylinder with opposing surfaces of the piston and the cylinder defining a pressure chamber. Pressurized hydraulic fluid within the pressure chamber urges the piston toward a brake friction pad causing the friction pad to move towards the brake rotor. As the piston urges the friction pad towards the rotor, a resilient piston seal is deformed. When the brake is disengaged, the hydraulic pressure is relieved and the deformation of the piston seal provides a force to urge the piston back to its original position with the friction pad moving away from the rotor.

Frequently, the deformation of the piston seal does not provide a sufficient force to return the friction pads to their disengaged position. This is particularly true in vehicles that are not driven regularly. As a result, the friction pads rub on the rotor causing numerous problems such as brake fade; excess wear on the pads, tires and disc; early wheel bearing failure; reduced fuel mileage; front end shimmy and steering instability.

In the prior art, disc brakes having apparatus for retracting brake pads when the brake is disengaged are known. An example of such is found in U.S. Pat. No. 4,364,455 to Oshima dated Dec. 21, 1982. Oshima teaches a disc brake having friction pads disposed on both sides of a rotatable disc. The friction pads are supported by a stationary member. A resilient member such as a coil spring, is provided between the stationary member and the friction pad for biasing the friction pad in a direction separating the pad from the disc. U.S. Pat. No. 3,008,546 to Erickson dated Nov. 14, 1961 shows a disc brake adjuster having springs mounted on headed nails with one end of the nails connected to a brake pad backing. The springs are compressed as the brake pad moves toward the brake disc. When the brake is disengaged, the force of compression in the springs urges the brake pad away from the disc. The spring and headed nails are mounted in a threaded spring mechanism which may be adjusted to vary a gap between the brake pad and brake disc without varying the compression of the spring.

While the prior art teaches disc brakes having spring actuated mechanisms for urging brake pads away from a brake rotor when the brake is disengaged, such apparatus incorporate designs which are dedicated for the particular brake mechanism in which they are employed. That is, such designs are not readily adaptable to existing brake structure so as to permit retroactive modification of brakes not incorporating such apparatus by design. Also, it would be desirable to have brakes with automatic retraction apparatus whereby the force of the retraction mechanism and the gap between the brake pads and the brake rotor may be readily and independently adjusted.

OBJECTS AND SUMMARY OF THE INVENTION

It is an object of the present invention to provide an apparatus for urging a brake pad away from a brake disc when a brake is disengaged by an operator.

A further object of the present invention is to provide a brake release mechanism which is readily adaptable for existing brake structure.

A yet further object of the present invention is to provide a brake release apparatus which has means for readily adjusting a distance between a brake pad and a brake rotor.

A still further object of the present invention is to provide a brake release apparatus having compression springs for releasing the brake pads with the compression force of the springs being readily and independently adjustable.

According to a preferred embodiment of the present invention a brake release attachment is provided for a disc brake having a rotary brake disc with friction pads disposed on opposite side of the discs. The friction pads are carried by a caliper which has a first end provided with means for pressing one of said pads toward the disc. The attachment comprises a pair of rigid rod members secured to one of the pads and extending therefrom with the first end of the caliper disposed between the rod members. Each rod is provided with a tab having a bore extending through the tab with the rods slidably received through the bores. A yoke member is provided shaped to extend around the first end of the caliper and rigidly connecting the tabs. Springs are provided surrounding the rods with the springs having one end which may be selectively positioned in a stationary location on the rod with a second end abutting the tabs such that the springs are compressed as the tabs move away from the brake pad as the pad approaches the rotor. A pair of stops are secured to the yoke member and extend therefrom with the stops opposing free ends of the rods such that the stops and free ends cooperate to limit the maximum displacement of the brake pad from the rotor and provide a maximum stroke between the brake pad and the rotor.

BRIEF DESCRIPTION OF THE DRAWINGS

FIG. 1 is a perspective view of a caliper type disc brake having a brake release attachment according to the present invention;

FIG. 2 is a cross sectional view of the brake release attachment and disc brake taken along line II—II of FIG. 1 with FIG. 2 showing the brake in a disengaged position;

FIG. 3 is the view of FIG. 2 showing the brake mechanism in an engaged position;

FIG. 4 is a view partially in cross section taken perpendicular to a plane of the disc rotor showing a brake having a brake release attachment according to the present invention; and FIG. 5 is a view taken in perspective of a brake release attachment according to the present invention surrounding a first end of a brake caliper.

DETAILED DESCRIPTION OF THE PREFERRED EMBODIMENT

Referring to the drawings, a caliper type disc brake is shown having a brake release attachment according to the present invention. Best shown in FIGS. 1 and 4, the caliper type disc brake is a commonly known brake which includes a rotary brake disc 10 mounted by means of bearings 11 on a stationary shaft 12. The brake disc 10 is directly connected to a vehicle wheel (not shown) by means of a plurality of wheel studs 13 such that the disc 10 rotates with the wheel. A stationary support 14 is provided and supports the shaft 12.

To effect braking of the disc 10 and its associated wheel, a caliper shown generally at 15 is provided and is supported on the support member 14 by means of an adapter 16 with the mechanism of support being well known in the art. The caliper has a first end 16 on an inboard side of the brake disc and a second end 17 on an outboard side of the brake disc 10. The first end 16 and second end 17 of the caliper 15 are both provided with brake friction pads 18 and 18a respectively. Since pads 18 and 18a are identical, a description of one will suffice for the description of the other and identical parts will be numbered identically except that elements of pad 18a will include an "a" in their numeral designation. Pad 18 is provided with a rigid backing plate 19 which has secured thereto a pad of friction material 20 which faces the brake disc 10.

The first end 16 of caliper 15 includes a block portion 40 with inner surfaces defining a cylindrical bore 21 partially therethrough and opposing the first backing plate 19. A piston 22 is received within the bore and sized to slide axially therein with opposing radial surfaces of the piston 22 and first end 16 defining a pressure chamber 23. An end 24 of the piston 22 exterior of the bore 21 abuts the first backing plate 19. Means (not shown) are provided to admit a pressurized fluid into the pressure chamber 23 to urge the piston 22 and friction pad 18 toward the disc 10 when the brake is engaged by an operator. As best shown in FIG. 5, calipers 15 include access slots 33 and 33a on the first end 16 disposed on opposite sides of block portion 40. Such access slots are typical of caliper designs and the slots extend through end 16 exposing a portion of first backing plate 19.

When a brake is engaged, the piston 22 and brake pad 18 move toward the disc 10 with simultaneous movement of the first end 16 of the caliper 15 moving away from the disc 10. As the first end moves away from the disc 10, the second end 17 moves toward the disc 10 thereby urging the second pad 18a toward the disc 10. A dust boot 26 is provided extending between the first end 16 and the piston 22 to block the passage of dust and other foreign material into the space defined between axially opposing surfaces of the piston 22 and cylinder 16. A piston seal 25 is provided to give a seal between opposing axial surfaces of the piston 22 and first end 16. As the piston 22 moves toward the disc 10, seal 25, due to its resilient character, is deformed. When an operator disengages the brake, seal 25 moves to assume its undeformed shape and thereby draws piston 22 away from disc 10. However, in practice seal 25 is often ineffective for urging the piston 22 to its disengaged position with the undesirable result that the pads 20 of friction material remain engaged against the disc 10 with the undesirable consequences previously mentioned. This phenomena is particularly troublesome in vehicles which are not driven regularly, such as motor homes, since the resilient seals 25 remain in one position so long that they lose some of their ability to release the brake mechanism. To overcome this problem, a brake release attachment shown generally at 30 is provided.

As shown in the drawings, the brake release attachment 30 of the present invention includes a pair of rigid rod members 31 and 31a having exterior threads along their length. The rod members 31 and 31a extend through access slots 33 and 33a respectively and are secured to the first backing plate 19 through any suitable means. Preferably, the rod members 31 and 31a are secured to the backing plate 19 by means of tapping a hole into the backing plate 19 with the first ends of the rods screwed into the holes and fixed thereto by means of tightly secured nuts 32 and 32a.

A pair of rigid tabs 35 and 35a are provided with the tabs having bores extending therethrough such that the rods 31 and 31a may be slidably received through the bores. As shown in the drawings, the tabs are provided with parallel surfaces which are in turn parallel to the backing plate 19. A yoke member 36 rigidly connects the tabs 35 and 35a such that they are linearly aligned and parallel to the backing plate 19. The yoke member 36 is preferably fabricated from a steel strap and is shaped to extend around block 40 with an inner surface of the yoke member 36 bearing against an outer surface of the block.

Compression springs 37 and 37a are provided surrounding rods 31 and 31a with the springs each having stationary first ends 38 and 38a disposed on the side of the tabs 35 and 35a away from the backing plate 19. Movable second ends 39 and 39a of the springs abut the tabs such that the tabs 35 and 35a compress the springs as the caliper 16 moves away from the disc 10. The first ends 38 and 38a of the springs 31 and 31a are kept in a stationary position which may be selectively adjusted by means of a nut 40 and 40a and washer 41 and 41a.

A pair of rigid stops 50 and 50a are provided. As shown in the drawings, the stops 50 and 50a are free ends of a common rigid bar 60 which is secured to the yoke member 36 through any suitable means such as welding. The stops 50 and 50a are aligned opposing free ends of the rods 31 and 31a. As shown in the drawings, the free ends of the rods 31 and 31a are provided with elongated spacer nuts 51 and 51a having interior threads such that the spacer nuts 51, 51a are threaded onto the free ends of the rods 31, 31a. The stops 50 and 50a act to limit the total stroke of the back plate 19 to no more than a predetermined desired stroke away from the disc 10.

In operation of the apparatus, the first end of the caliper moves away from the disc 10 as the first backing plate 19 moves toward the disc 10 when an operator engages a brake. As this occurs, the yoke member 36 which is shaped to be snugly received on the block portion 40 moves away from the backing plate 19. Rod members 31 and 31a secured to the backing plate 19 move with the plate 19 with the rod members sliding between the bores of tabs 35 and 35a. As the rod members continue to slide within the bores as the backing plate 19 moves away from the yoke 36, the tabs 35 and 35a compress the springs 36 and 36a. When an operator disengages the brake, pressure within the pressure chamber 23 is relieved and the compression of the springs 37, 37a acts on the tabs 35, 35a drawing the backing plate 19 toward the first end 16 of the caliper. To limit the stroke the backing plate 19 may move from the brake disc 10 and thereby prevent excessive brake travel, the stops 50 and 50a engage the spacer nuts 51 and 51a after the backing plate 19 has traveled a maximum desired stroke. As can be seen from the foregoing, the amount of the stroke can be adjusted by selecting the length of spacer nuts 51 and 51a or, more readily, by simply turning the nuts 51 and 51a to reposition their locations on the rods 31 and 31a. Additionally, the compression of springs 37 and 37a may be selectively adjusted by turning nuts 40 and 40a, respectively.

From the foregoing it can be seen how the brake release attachment of the present invention can be used to modify existing caliper type brakes to effectively draw the brake pads away from the brake disc 10 when an operator disengages a brake. Accordingly, a brake operator need not rely upon the action of piston seals 25 and the operator benefits from the positive action of the present brake release attachment. Furthermore, the brake release attachment is of simple construction and may be easily installed on existing brake apparatus. Furthermore, once installed the compression of the springs as well as the maximum stroke of the backing plate can be easily and independently adjusted. While the foregoing has been described as a brake release attachment for existing brake designs, as is the preferred embodiment, the attachment could be incorporated into new brake designs such that the yoke 36 and stops 50 and 50a are integral with the caliper or through such other method as would be apparent to those skilled in the art.

From the foregoing, it can be seen how the objects of the invention have been attained in a preferred embodiment. However, it is not intended that the scope of the invention be limited to the specific structure shown. It is intended that this invention will include such modification and equivalents of the disclosed embodiment as will appear to those skilled in the art. The scope of the invention is intended to be limited only by the scope of the claims which are appended hereto.

What I claim is:

1. A brake release attachment for a caliper type disc brake having a rotary brake disc; first and second brake friction pads on opposite sides of said disc with said pads having respectively first and second backing plates and pads of friction material on said backing plates facing said disc; a caliper having a first end and a second end with said first end having means housed within a housing for pressing said first backing plate toward said disc with said first end moving away from said disc and with said second end pressing said second backing plate toward said disc, said housing having openings exposing said first backing plate; the attachment comprising:
   a pair of rigid rod members;
   means for securing first ends of said rod members to said first backing plate with said rod members extending generally perpendicularly away from said backing plate and terminating at free ends said rods disposed on said first backing plate substantially exterior of said housing and extending through said openings in said housing exposing said first backing plate and with said first end of said caliper disposed between said rods;
   a rigid yoke exterior of said housing and having a pair of spaced apart rigid tabs with bores therethrough with said rods slidably received through said bores; said yoke member shaped to extend around said first end of said caliper with said yoke presenting a bearing surface opposing a surface of said first end of said caliper which moves away from said disc when said first backing plate is moved toward said disc;
   springs carried on said rods and having first ends disposed on a side of said tabs away from said first backing plate and having second ends engaging said tabs with said tabs compressing said springs as said first end of said caliper moves away from said disc;
   a pair of rigid stops secured to said yoke for movement therewith with said stops aligned opposing free ends of said rods blocking said rods and said first backing plate from moving more than a predetermined desired stroke away from said disc whereby said attachment may readily adapt said caliper type disco brake to automatically move said friction pads from said disc when a vehicle operator disengages a brake and said attachment limits the movement away from the disc thereby abating excessive brake pedal travel.

2. A brake release attachment according to claim 1 comprising means for selectively adjusting said predetermined desired stroke.

3. A brake release attachment according to claim 2 wherein said means for selectively adjusting said predetermined desired stroke comprises said free ends of said rods being threaded; spacer nuts having threads to be received on said free ends with said nuts opposing said stops whereby said stroke is adjustable by turning said spacer nuts.

4. A brake release attachment according to claim 1 comprising means for selectively adjusting compression of said springs.

5. A brake release attachment according to claim 3 wherein said means for selectively adjusting compression of said springs comprises said free ends of said rods being threaded; adjusting nuts having threads to be received on said free ends with said nuts abutting said springs and providing said stationary ends of said springs with said stationary ends repositionable by turning said adjusting nuts whereby compression of said springs may be adjusted.

6. A disc brake comprising:
   a rotary brake disc;
   first and second brake friction pads on opposite sides of said disc with said pads having respectively first and second backing plates and pads of friction material on said backing plates facing said disc;
   a caliper having a first end and a second end with said first end having means for pressing said first backing plate toward said disc with said first end moving away from said disc and with said second end pressing said second backing plate toward said disc;
   a pair of rigid rod members secured to said first backing plate and extending generally perpendicularly away from said first backing plate and terminating at free ends; said rod members disposed on said first backing plate with said first end of said caliper disposed between said rods;
   a pair of rigid tabs having bores therethrough with each of a said tabs slidably mounted on said rod members with said rod members extending through said bores;
   a rigid yoke member secured to said tabs and extending between said tabs generally coplanar with said rod members with said yoke presenting a bearing surface opposing in force transmitting relation a surface of said first end of said caliper which moves away from said disc as said first backing plate moves toward said disc;

springs carried on said rods and having stationary first ends disposed on a side of said tabs away from said first backing plate and having second ends engaging said tabs with said tabs compressing said springs as said first end of said caliper moves away from said disc; and a pair of rigid stops secured to said yoke member and aligned opposing free ends of said rods in movement blocking relation blocking said rods and said first backing plate from moving more than a predetermined stroke away from said disc; and means for selectively adjusting a spacing between said stops and said opposing free ends to selectively adjust said predetermined stroke.

7. A disc brake according to claim 6 wherein said adjusting means comprises said free ends of said rods being threaded; spacer nuts having threads to be received on said free ends with said nuts opposing said stops whereby said stroke is adjustable by turning said spacer nuts.

8. A disc brake according to claim 6 comprising means for selectively adjusting compression of said springs.

9. A disc brake according to claim 8 wherein said means for selectively adjusting compression of said springs comprises free ends of said rods being threaded; adjusting nuts having threads to be received on said free ends with said nuts abutting said springs, said ends of said springs being repositionable by turning said adjusting nuts whereby compression of said springs may be adjusted.

* * * * *

UNITED STATES PATENT AND TRADEMARK OFFICE
CERTIFICATE OF CORRECTION

PATENT NO. : 4,662,483

DATED : May 5, 1987

INVENTOR(S) : Leon W. Boeck

It is certified that error appears in the above-identified patent and that said Letters Patent is hereby corrected as shown below:

Column 2, line 13, "adapatable" should be --adaptable---;

Column 6, line 16, "disco" should be --disc--;

Column 6, line 62 "each of a said tabs" should be "each of said tabs--; and

Column 7, line 4, "having stationary first" should be --having first--.

Signed and Sealed this

Twenty-fourth Day of November, 1987

Attest:

DONALD J. QUIGG

*Attesting Officer*    *Commissioner of Patents and Trademarks*